United States Patent
Ho

(10) Patent No.: US 6,758,375 B2
(45) Date of Patent: Jul. 6, 2004

(54) SPILL-RESISTANT, SMOOTHER POURING CONTAINER FOR LIQUIDS

(76) Inventor: I-Chung Ho, 6958 Grovespring Dr., Rancho Palos Verdes, CA (US) 90275

( * ) Notice: Subject to any disclaimer, the term of this patent is extended or adjusted under 35 U.S.C. 154(b) by 120 days.

(21) Appl. No.: 10/043,595

(22) Filed: Jan. 9, 2002

(65) Prior Publication Data

US 2002/0145012 A1 Oct. 10, 2002

Related U.S. Application Data

(60) Continuation-in-part of application No. 09/572,001, filed on May 15, 2000, now Pat. No. 6,374,541, which is a continuation of application No. 09/250,791, filed on Feb. 17, 1999, now Pat. No. 6,098,850, which is a division of application No. 08/873,070, filed on Jun. 11, 1997, now Pat. No. 5,934,017.

(51) Int. Cl.[7] .................................................. G01F 11/26
(52) U.S. Cl. ...................... 222/454; 222/457; 222/479; 222/482; 222/564
(58) Field of Search ................................ 222/454, 455, 222/456, 457, 547, 564, 464.1, 485.1, 479

(56) References Cited

U.S. PATENT DOCUMENTS

| | | | |
|---|---|---|---|
| 236,997 A | 1/1881 | Dodge | 222/456 |
| 570,759 A | 11/1896 | Law | 222/456 |
| 836,466 A | 11/1906 | Sears | 222/456 |
| 845,175 A * | 2/1907 | Hutchins | 222/425 |
| 1,151,997 A | 8/1915 | Beck et al. | 222/479 |
| 2,370,820 A * | 3/1945 | Stott | 222/456 |
| 2,387,699 A | 10/1945 | Bates | 222/482 |
| 3,090,532 A * | 5/1963 | Robson | 222/456 |
| 3,410,459 A | 11/1968 | Conley | 222/479 |
| 3,902,652 A | 9/1975 | Malcolm | 222/566 X |
| 4,073,397 A | 2/1978 | Snodgrass | 215/1 |
| D270,518 S | 9/1983 | Duering | D9/317 |
| 4,412,633 A | 11/1983 | Guerrazzi et al. | 222/468 |
| 4,437,587 A | 3/1984 | Duering | 222/207 |
| 4,491,245 A | 1/1985 | Jamison | 222/575 X |
| D288,334 S | 2/1987 | Simons | D16/32 |
| D288,889 S | 3/1987 | Mantani | D7/312 |
| 4,856,685 A * | 8/1989 | Gaffney | 222/454 |
| 4,935,283 A | 6/1990 | Jamison | 428/174 |
| 5,067,501 A | 11/1991 | Auger | 132/116 |
| 5,085,355 A * | 2/1992 | Yoshimura et al. | 222/564 |
| 5,123,575 A | 6/1992 | Li | 222/564 |
| D348,802 S | 7/1994 | Miller, III | D7/510 |
| 5,356,053 A | 10/1994 | Di Fatta | 222/456 |
| 5,467,903 A * | 11/1995 | Sorensen et al. | 222/455 |
| 5,509,579 A * | 4/1996 | Robbins, III | 222/109 |
| 5,579,962 A | 12/1996 | Chen | 222/478 |
| 5,819,994 A * | 10/1998 | Leipold | 222/541.9 |
| 5,897,035 A | 4/1999 | Schlomer | 222/479 |
| 6,460,741 B1 * | 10/2002 | Ho | 222/482 |

FOREIGN PATENT DOCUMENTS

| | | | | |
|---|---|---|---|---|
| JP | 402092318 A | | 4/1990 | A47J/31/06 |
| WO | WO-9424011 | * | 10/1994 | B65D/25/42 |

* cited by examiner

*Primary Examiner*—Michael Mar
*Assistant Examiner*—Frederick C. Nicolas

(57) ABSTRACT

The improved container for storing and dispensing liquids has a baffle which resists spilling and pours more smoothly than prior containers. The baffle may be located between the mouth opening and the interior of the container chamber. When the improved container is tilted for pouring, such that the liquid level inside the container chamber is higher than the liquid level at the mouth opening, no liquid pours out of the container. The liquid starts to flow out of the mouth opening only after the container is tilted beyond a predetermined start-to-pour angle. The start-to-pour angle is reached when the container is tilted to allow the outside air to enter the container chamber. The baffled container may have an optional notch on the baffle to reduce glugging and to result in a smoother pour. The improved container can be manufactured in a simple one-step blow molding process.

32 Claims, 7 Drawing Sheets

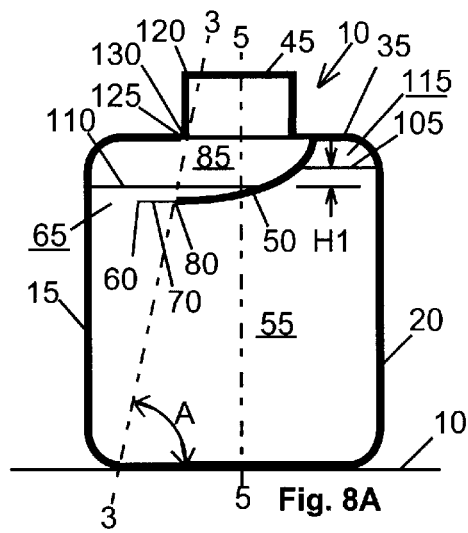
Fig. 8A
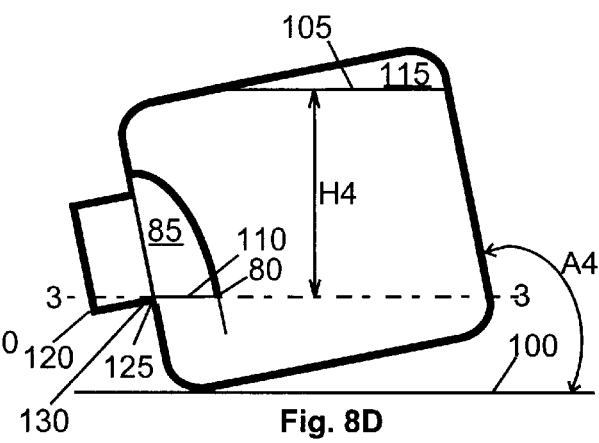
Fig. 8D
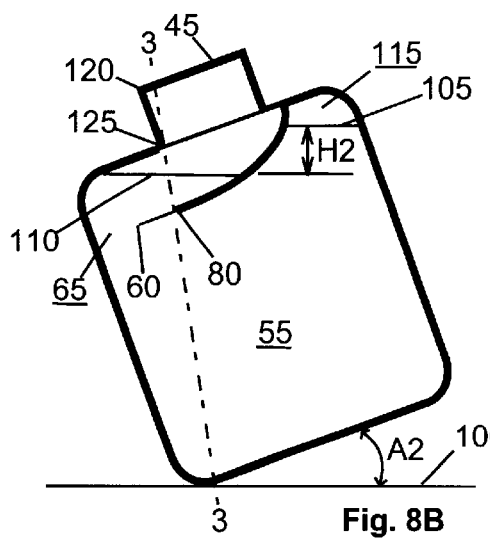
Fig. 8B
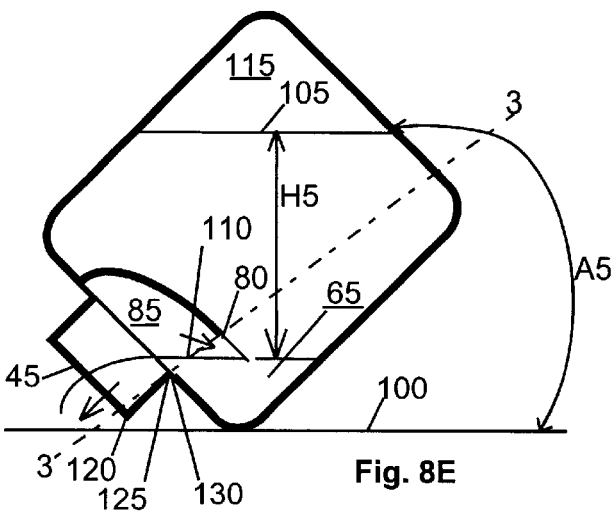
Fig. 8E
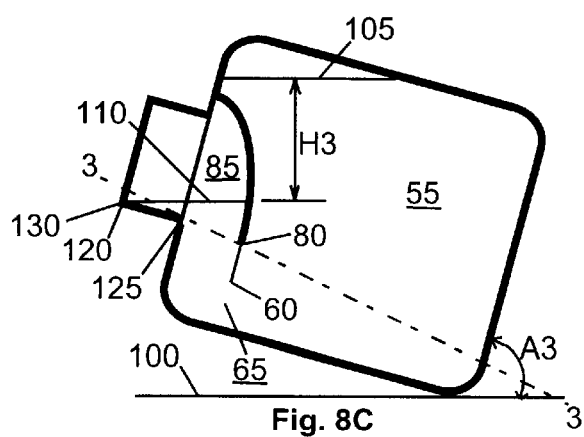
Fig. 8C
Figure 8

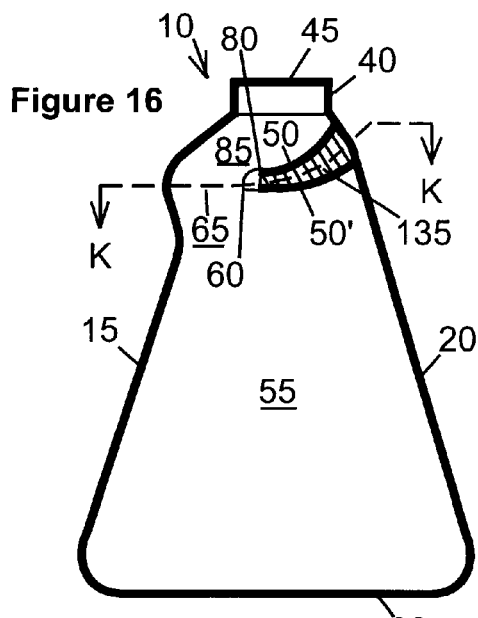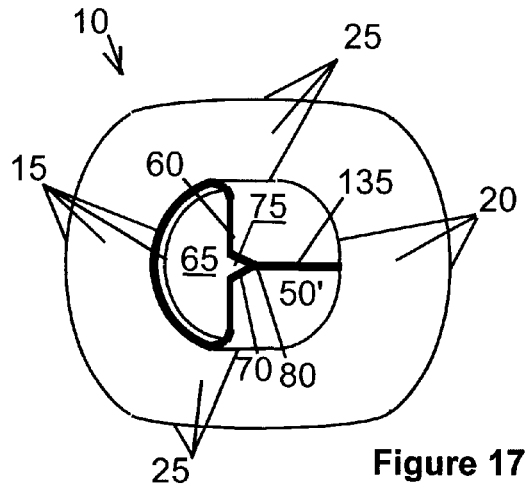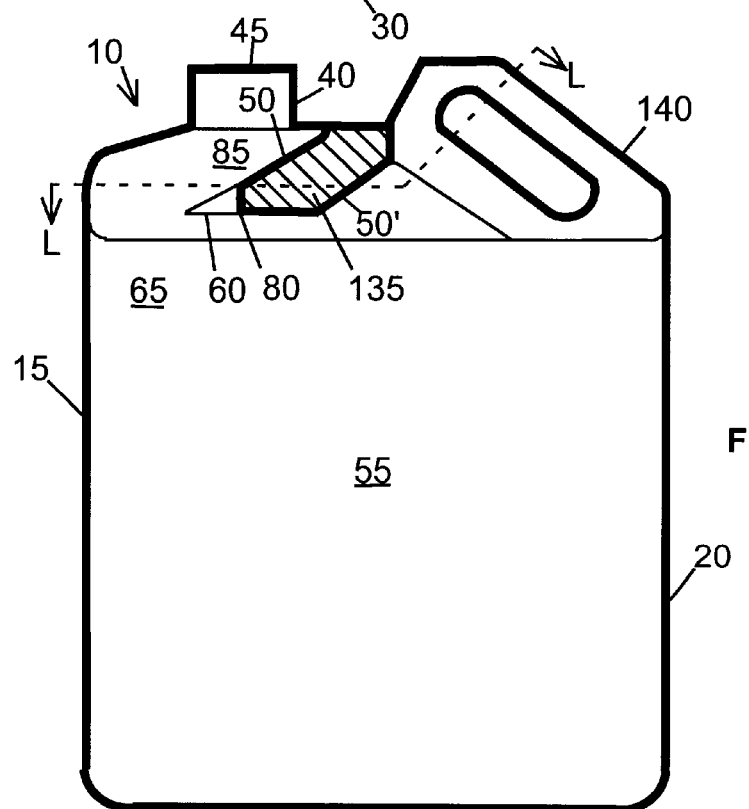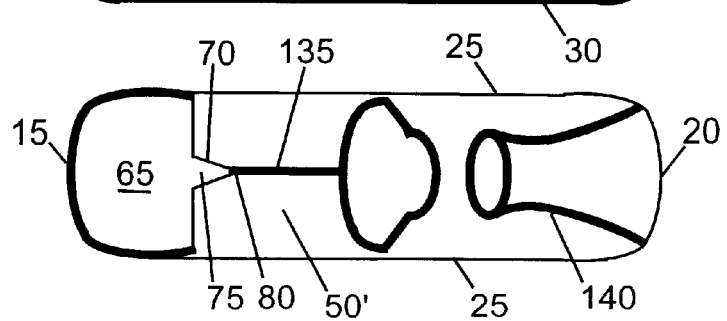

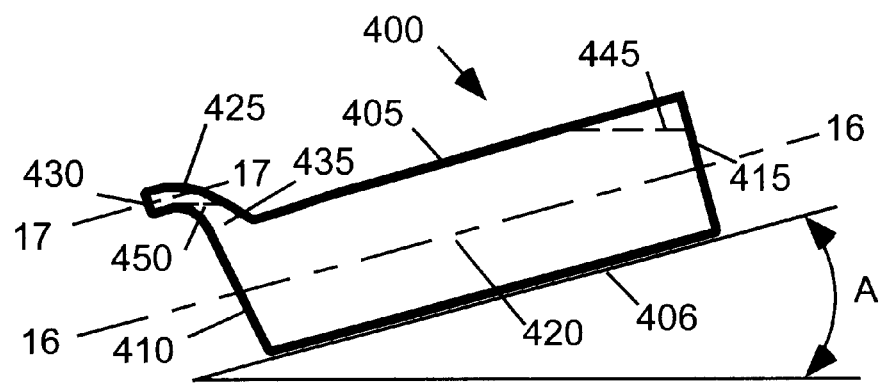
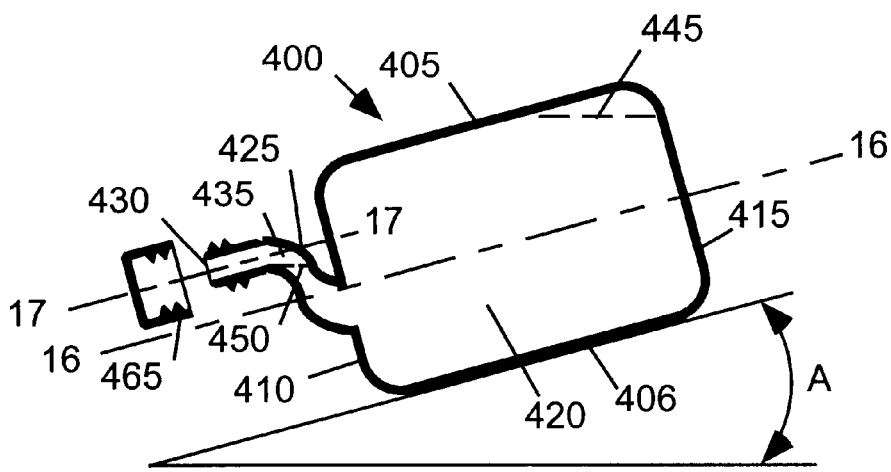
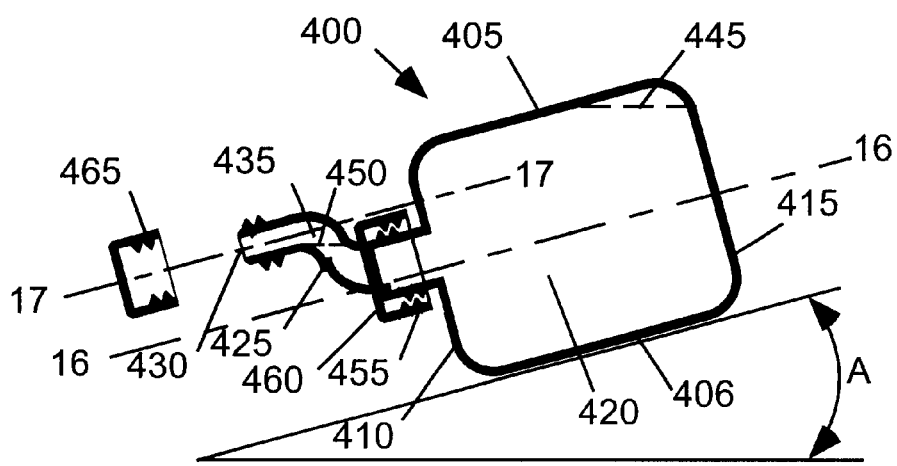
Figure 20

SPILL-RESISTANT, SMOOTHER POURING CONTAINER FOR LIQUIDS

CROSS REFERENCE TO RELATED APPLICATIONS

The present application is a continuation-in-part of U.S. patent application Ser. No. 09/572,001 filed May 15, 2000 U.S. Pat. No. 6,374,541, which is a continuation of U.S. patent application Ser. No. 09/250,791 filed Feb. 17, 1999, now U.S. Pat. No. 6,098,850, which is a divisional of application Ser. No. 08/873,070 filed Jun. 11, 1997, now U.S. Pat. No. 5,934,017, and is related to U.S. patent application Ser. No. 09/429,103 filed Oct. 28, 1999, which is a continuation-in-part of application Ser. No. 09/250,791 filed Feb. 17, 1999. The entirety of each of these disclosures is incorporated herein by reference for all purposes.

FIELD OF THE INVENTION

The field of the invention is containers for dispensing a liquid and more particularly, is containers for dispensing a liquid with a smoother pour and/or with reduced spilling.

BACKGROUND OF THE INVENTION

Man has used containers for storing and dispensing liquids for millenniums. However, containers still have their problems. For example, when pouring a full container of liquid into a smaller receptacle such as a cup, one may spill the liquid. Some containers spill very easily. This problem arises when pouring a container of juice or milk into a glass, pouring a can of motor oil into the engine, pouring antifreeze liquid into the radiator. Sometimes, spilling occurs because the container is too full of liquid and the receptacle (e.g., a short cup or a low radiator with a fender in the way) is too low and distant from the container. Under these circumstances, man has resorted to using a funnel, being extra careful when pouring, or lifting the cup to the container. Therefore, there is a need for an improved container, which ideally does not spill when pouring and realistically, is spill-resistant.

When pouring liquid from a container, the same volume of air preferably enters the container to replace the liquid being poured out. A phenomenon referred to as "glugging" occurs when the liquid is poured more quickly from the container than air can enter the container. Glugging occurs when too much liquid tries to flow out of the container and not enough room is available in the outflow passageway for air to enter into the container to replace the volume of the outflowing liquid. When this happens, a partial vacuum is created inside the container that momentarily stops liquid from flowing out. Once the liquid flow stops, air starts to enter the container and when the incoming air has eliminated the partial vacuum, the liquid can resume its out flow. This intermittent and repeated liquid flowing and stopping is referred to as "glugging" and makes the pouring unstable, undesirable and less smooth. Glugging can also cause spills. Therefore, there is also a need for a container which reduces the glugging effect.

On the market, some container designs have a hollow handle molded near the mouth opening of the container. An air vent passageway is provided between the mouth opening and the hollow handle so that a separate air vent is provided. The air from the mouth opening travels down the vent passageway, through the hollow handle, and into the container to help reduce glugging. However, a further improved container which better eliminates glugging and improves the smoothness of the liquid flow is needed.

SUMMARY OF THE INVENTION

The improved container for storing and dispensing liquids has a baffle. The improved container resists spilling and pours the liquid more smoothly. The baffle may include an optional notch or vent structure for reducing "glugging" or for allowing the liquid to pour more smoothly.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIGS. 8A through 8E are schematic representations which illustrate how the spill-and-glug-resistant container works when the liquid is filled higher than the proper fill line.

FIG. 16 is a schematic representation of the cross-sectional side view of another example embodiment of a spill-and-glug-resistant container where the baffle is an integral part of a blow-molded container.

FIG. 17 is a schematic representation of the cross-sectional view of the improved container of FIG. 16 taken along line K—K.

FIG. 18 is a schematic representation of the cross-sectional side view of yet another example embodiment of a spill-and-glug-resistant container where the baffle is an integral part of a blow molded container.

FIG. 19 is a schematic representation of the cross-sectional view of the improved container of FIG. 18 taken along line L—L.

FIGS. 20A–20C show examples of liquid bottle designs with an extended neck feature which may be used as a refillable water bottle or for many other applications.

DETAILED DESCRIPTION OF THE INVENTION

Figure 1:
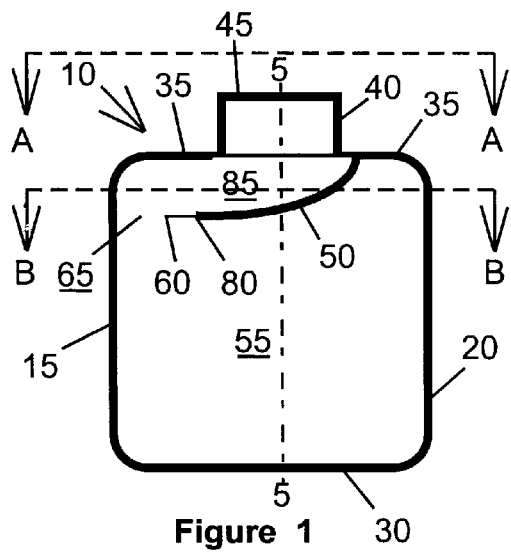
FIG. 1 is a schematic representation of a cross-sectional side view of an example embodiment of the improved container.
Figure 2:
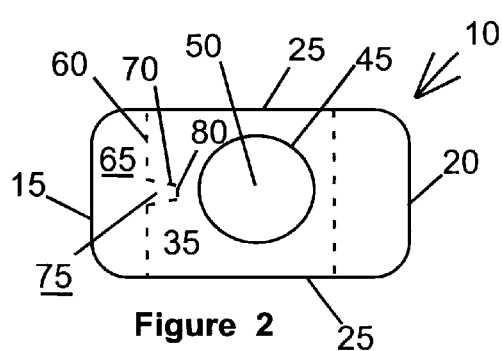
FIG. 2 is a schematic representation of the top view of the improved container of FIG. 1 taken along line A—A.
Figure 3:
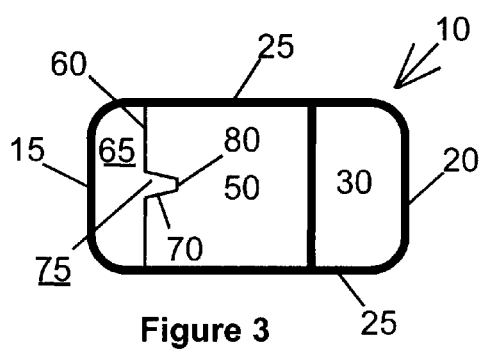
FIG. 3 is a schematic representation of the cross-sectional view of the improved container of FIG. 1 taken along line B—B.

FIG. 1 is a schematic representation of the cross-sectional side views of a preferred example embodiment of a spill-and-glug-resistant container 10, which is referred to as a baffled container. The heavy dark line shown in this drawing and all following drawings represent the cut walls of the container. FIGS. 1–3 illustrate various views of a substantially rectangular container 10 with rounded corners and four sidewalls: the pouring sidewall 15, the opposite sidewall 20 and the other two sidewalls 25 in between. FIG. 2 is a schematic representation of the top view of the baffled spill-and-glug-resistant container 10 of FIG. 1 taken along line A—A. FIG. 3 is a schematic representation of the cross-sectional view of the spill-and-glug-resistant container 10 of FIG. 1 taken along line B—B. A bottom 30, a top 35, a bottle neck 40 and a mouth opening 45 completes otherwise the basic construction of a typical container. The bottle neck 40 need not be a discrete separate part of the container. Designs having no definitive neck are permitted as long as they include a baffle. A vertical axis 5—5 through the center of the mouth opening projects the mouth opening to the interior chamber 55 of the container 10.

As shown in FIGS. 1–3, the baffled container 10 has an additional baffle panel 50 formed or inserted from one side of the container 10. The baffle 50 maybe connected to the top 35 as shown in FIG. 1 or to the opposite sidewall 20. This baffle 50 extends from the interior chamber 55 at or near the mouth opening 45 and cuts through the vertical axis 5—5 toward the pouring sidewall 15. The edge 60 of the baffle 50 does not touch the pouring sidewall 15 and has a gap from the pouring sidewall 15 to form a baffle opening 65.

At the edge 60 of the baffle 50, there is preferably a notch 70 with its notch opening 75 next to the baffle opening 65 (notch 70 and notch opening 75 are better seen in FIGS. 2 and 3). The "end point" 80 of the notch 70 is the portion of the notch farthest from the pouring sidewall 15. The cavity on the upper side of the baffle 50 (between the baffle 50 and the mouth opening 45) forms an outflow passageway 85 leading from baffle opening 65 to the mouth opening 45. When pouring liquid from the container 10, as illustrated, the vertical axis 5—5 is rotated in a counter-clockwise direction with the mouth opening 45 tilting toward the pouring sidewall 15.

Liquid starts to flow from the interior chamber 55 of the container 10 through baffle opening 65, through outflow passageway 85, and then through mouth opening 45. The baffle 50 may be a flat panel, a curved panel (as shown), or any other suitable curvature and shape. This baffle 50 preferably covers at least part of the projected mouth opening. In this example, the baffle panel 50 covers the entire projected mouth opening as shown in FIG. 2. By contrast, the baffle 50 shown in FIG. 5 covers only a portion of the projected mouth opening (the notch 75 prevents the baffle 50 from covering all of the projected mouth opening). The amount of the projected mouth opening which is covered or blocked is an important factor in determining the start-to-pour angle of the container, which will be described later.

From the view provided by FIG. 2, it is clearly shown that the baffle 50 blocks the entire projection of the mouth opening 45 into the interior chamber 55 of the container 10. As shown in FIG. 3, the baffle 50 is sealingly connected to, integrally formed, attached, bonded, inserted, or otherwise attached to the container walls, except that one edge 60 of the baffle 50 and the notch 70 are not connected to the container walls. The space between the edge 60 of the baffle 50 and the pouring sidewall 15 forms the baffle opening 65 and the small notch 70 on the baffle forms a small notch opening 75. The distance between the edge 60 of the baffle 50 and the sidewall 15 may be small, but the area of the opening 65 should be sufficiently large (e.g., equal to or larger than the mouth opening 45) for dispensing the liquid. The small notch opening 70 plays an important role in the anti-glugging function. Its operation will be described later such as with respect to FIGS. 7A–7F and 8A–8E.

Figure 4:
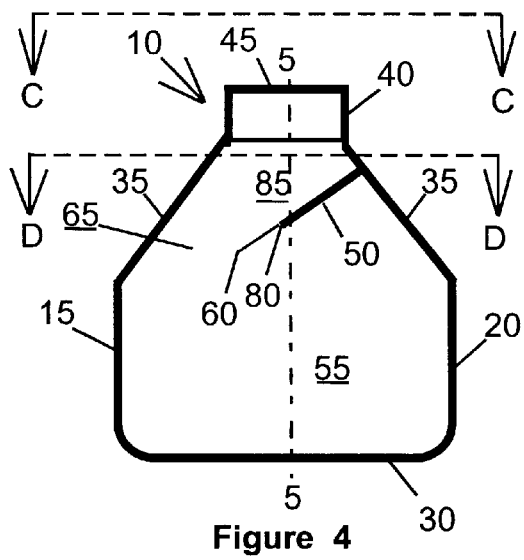
FIG. 4 is a schematic representation of a cross-sectional side view of another example embodiment of an improved container.

FIG. 4 is a schematic representation of another preferred example embodiment of a baffled container 10. This example container has a circular body with a conical top 35. The baffle 50 extends from one side of the container toward the opposite side. The portion of the sidewall facing the edge 60 of the baffle 50 may be designated as being the pouring sidewall 15 and the opposite sidewall designated as being the opposite sidewall 20. The baffle 50 extends from the conical top 35 of the opposite sidewall 20 toward the pouring sidewall 15. In this example, the baffle 50 is an inclined flat plane. However, the baffle 50 can be curved or in other suitable configurations and shapes.

Figure 5:
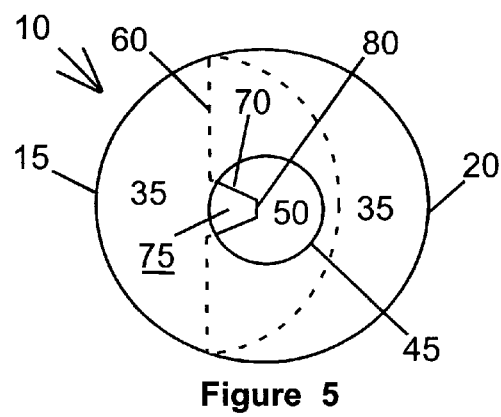
FIG. 5 is a schematic representation of the top view of the improved container of FIG. 4 taken along line C—C.
Figure 6:
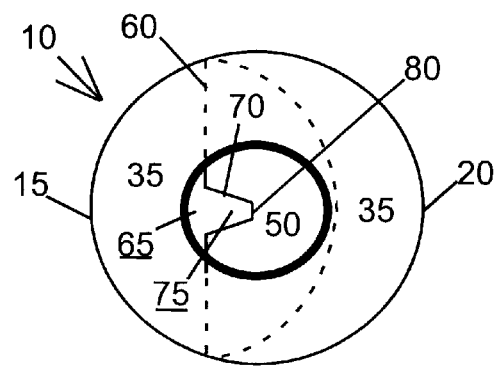
FIG. 6 is a schematic representation of the cross-sectional view of the improved container of FIG. 4 taken along line D—D.
Figure 7:
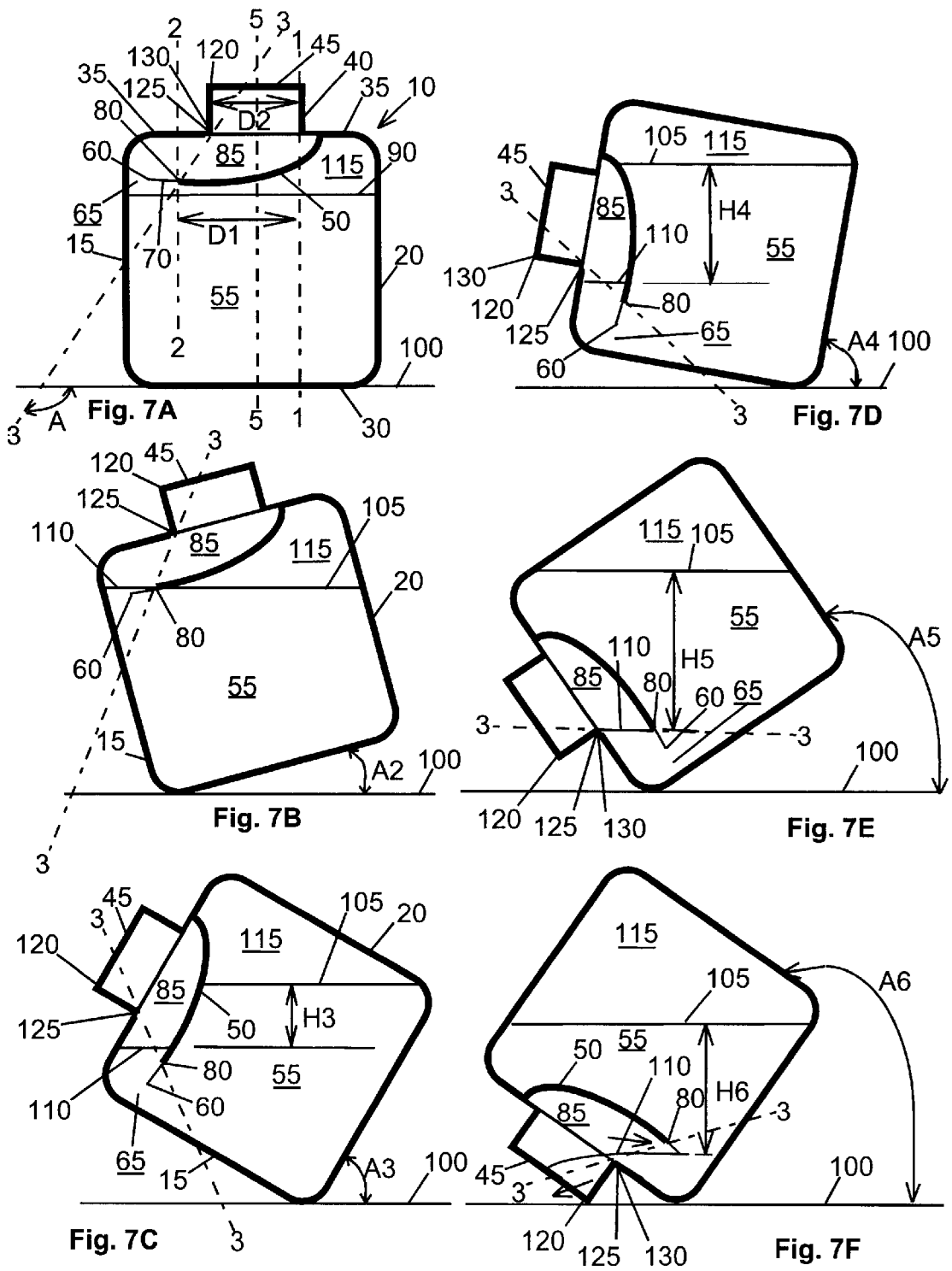
FIGS. 7A through 7F are schematic representations which illustrate how the spill-and-glug-resistant container operates.

FIG. 5 is a schematic representation of the top view of the container 10 of FIG. 4 taken along line C—C and FIG. 6 is a schematic representation of the cross-sectional view of the container 10 of FIG. 4 taken along line D—D. The sloped baffle 50 extends from the conical top 35 of the opposite sidewall 20 toward the pouring sidewall 15. A function of the baffle 50 is to block or partially block direct communication between the mouth opening 45 and the interior chamber 55 of the container 10. The amount by which the projection of the mouth opening 45 is blocked by the baffle 50 affects the start-to-pour angle of the container 10 and may affect how fast it takes to empty or fill the container. The baffle notch 70 reduces the effective blockage area by the baffle 50, which will be described in more detail later. In the example shown in FIG. 5, the baffle 50 effectively blocks slightly more than 50% of the mouth opening 45 where the effective blockage starts from the end point 80 of the notch 70 to the right of the mouth opening 45.

FIGS. 7A–7F are schematic representations, which illustrate how the baffled container 10 works when the liquid is filled to the proper fill line 90. As shown in FIG. 7A, the container 10 is filled with a liquid just below the baffle 50, viewing the liquid level when the container is placed on a horizontal flat surface 100. The proper fill line can be above the end point 80 of the notch 70, depending on the size and shape of the outflow passageway 85 and of the container 10. A vertical axis 1—1 perpendicular to the horizontal flat surface 100 is located at the utmost right edge of the mouth opening 45. A second vertical axis 2—2 passes through the end point 80 of the notch 70 and is parallel with axis 1—1. Another axis 3—3 is a line which passes through the end point 80 of the notch 70 and the apex point 130 of the mouth opening 45 of the container 10. Because the end point 80 and the apex point 130 are offset horizontally with respect to each other, axis 3—3 in FIG. 7A need not be a vertical line. However, if the end point 80 and the apex point 130 are not offset horizontally from each other, the axis 3—3 will be a vertical line. The apex point 130 of the mouth opening 45 may be a definitive point or a moving point depending on the tilting angle of the container 10, which will be explained later. The apex point 130 shown in FIG. 7A is based on the tilting angle which equals the start-to-pour angle A5 as shown in FIG. 7E. The angle between axis 3—3 and the horizontal surface 100 forms the start-to-pour angle A (in this case, angle A is equal to angle A5), if the minor factors such as surface tension and wetting characteristics of the liquid are ignored. The distance D1 between axis 1—1 and axis 2—2, as compared with the diameter of the mouth opening D2, defines the effective coverage of the baffle 50. If D1/D2 equals 1.0, 100 percent of the mouth opening 45 is covered by the baffle 50, axis 2—2 will coincide with axis 3—3 and the start-to-pour angle will be equal to 90 degrees. In the particular example illustrated in FIG. 7A, the baffle 50 covers at least 100 percent of the mouth opening 45 (e.g., D1 is greater than D2) and the start-to-pour angle A is greater than 90 degrees. When pouring liquid out of the container 10, the vertical axis 5—5 of the container 10 is slowly turned by lowering the pouring sidewall 15 and raising the bottom 30 toward the opposite sidewall 20. As illustrated in FIG. 7A, the container 10 is turned in a counter-clockwise direction. The points at which the liquid level line 90 contacts the sidewalls start to move higher up the pouring sidewall 15 and move lower down the opposite sidewall 20, as shown in FIG. 7B.

At turning angle A2 as shown in FIG. 7B, the liquid level line touches the end point 80 of the notch 70. Once the liquid touches the end point 80 of the notch 70, the interior air cavity 115 inside the interior chamber 55 of the container 10 becomes isolated and can no longer communicate with the outside ambient air. After this turning angle A2, the liquid level 90 splits into two liquid levels, the interior liquid level 105 and the exterior liquid level 110. As the container is turned further from angle A2 to A3 in FIG. 7C, the interior liquid level 105 is higher than the exterior liquid level 110. Liquid starts to flow from the interior chamber 55 of the container toward the mouth opening 45 through baffle opening 65 and outflow passageway 85. The height difference between liquid levels 105 and 110 is determined by the basic principles of fluid mechanics and can be expressed by the equation:

$$Pa-Pi=K \times H,$$

where Pa is the ambient air pressure at the mouth opening 45, Pi is the interior air pressure of the interior air cavity 115, K is the specific weight of the liquid and H is the height difference between the liquid levels 105 and 110. FIG. 7C shows the height difference as H3.

As the tilting angle A3 increases, more liquid flows out of the interior chamber 55 into the passageway 85, which leads to an increase in volume of the interior air cavity 115 (comparing FIGS. 7B and 7C) and a decrease in pressure of the interior air cavity 115. Because the ambient pressure Pa and the specific weight K stay constant, the interior air pressure Pi can be calculated by:

$$Pi=Pa-(K \times H).$$

The interior air pressure Pi is less than the ambient air pressure Pa, which creates a partial vacuum inside the container 10. This relationship holds true for the static conditions of any tilting angle. As shown in FIG. 7C, the height difference H3 will have a corresponding interior air pressure Pi3 for given tilting angle A3 and the above equation becomes:

$$Pi3=Pa-(K \times H3).$$

In this example embodiment, the increase in tilting angle from A3 to A4 in FIG. 7D results in an increased height difference H4 and a further reduced interior air pressure Pi4. At this position, the exterior liquid line 110 is still below the apex point 130 and cannot flow out of the mouth opening 45. Apex point 130 is a moving threshold for the liquid to flow out of the mouth opening 45; in other words, the apex point 130 is the then-current highest point in the outflow passageway at any tilting angle. In this example, the apex point 130 can be located at either the lowest point 120 of the mouth opening 45 or at the lowest point 125 of the neck depending on the tilting angle.

When the container 10 continues to tilt from FIG. 7D to FIG. 7E, the exterior liquid level 110 reaches the end point 80 of the notch 70. Any tilting angle greater than this tilting angle A5 allows ambient air to enter into the interior chamber 55 of the container 10 through the partially exposed notch opening 75, thereby breaking the partial vacuum Pi5. As soon as the outside ambient air enters the container 10, the interior air pressure Pi5 suddenly increases and the above equation can no longer hold true. Therefore, liquid will continue to flow out of the container to reduce the height difference H5 until a new balance is reached. Thus, the spill-and-glug-resistant container preferably has a vent notch 70 on the baffle 50 to serve as an air vent. The air vent allows air to pass from outside the container into the container during pouring, which reduces glugging.

If the notch opening 75 does not exist, the outflow passageway 85 and the baffle opening 65 cannot simultaneously provide smooth liquid outflow and air inflow at the same time. Under this circumstance, an undesirable glugging phenomenon may occur because too much liquid starts to flow out as compared to the amount of air entering the container to replace the volume of the outflow liquid. The temporary partial vacuum created in the interior air cavity 115 inside the interior chamber 55 momentarily stops the outflow liquid. Once the outflow liquid stops, air is able to re-enter the container to eliminate the partial vacuum, allowing the outflow of liquid to resume again. This intermittent stop-and-start of the outflow liquid makes the flow of liquid unstable. The unstable glugging flow could cause spilling and is an undesirable condition. Thus, the addition of a baffle notch 70 with notch opening 75 eliminates or reduces the glugging, non-smooth flow of the liquid.

When the container 10 is tilted further to angle A6 as shown in FIG. 7F, the notch opening 75 of the baffle 50 is higher than the exterior liquid level 110 of the outflow. At this tilting angle, the baffle opening 65 is sufficiently large to handle the outflow liquid. The small notch opening 75, which is above the exterior liquid line 110 and exposed to the ambient air, can be devoted for venting incoming air. By venting the air, a partial vacuum inside the container is not formed or is formed to a lesser degree. This allows the continuous outflow of liquid until all the liquid has been dispensed when the height difference H6 is reduced to zero with little chance of glugging.

FIGS. 8A–8E are schematic representations which illustrate how a spill-and-glug-resistant container 10 works when the liquid is filled higher than the proper fill line 90 as shown in FIG. 7A. As shown in FIG. 8A, the exterior liquid line 110 partially covers the baffle 50 when viewing the container placed on a horizontal flat surface 100. The interior liquid line 105 may be either above or below the exterior liquid line 110. In this illustration, the interior liquid line 105 is higher than the exterior liquid line 110 with a height difference of H1. Interior air cavity 115 inside the interior chamber 55 of the container 10 is isolated and cannot communicate with the outside ambient air. The air pressure at the interior air cavity 115 is lower than the ambient pressure. By contrast, if the interior liquid level line 105 is lower than the exterior liquid level line 110, the interior air cavity 115 will have a higher air pressure. When pouring a liquid out of the container 10, the vertical axis 5—5 of the container 10 is slowly turned by lowering the pouring sidewall 15 and raising the bottom 30 toward the opposite sidewall 20. Referring to FIG. 8A, the container 10 is turned in a counter-clockwise direction. The point at which the exterior liquid level line 110 contacts the pouring sidewall 15 starts to move upward while the point at which the interior liquid level line 105 contacts the opposite sidewall 20 starts to move downward, as shown in FIG. 8B, so that the height difference increases from H1 to H2.

As the container is turned further from tilting angle A2 to A3 in FIG. 8C, more liquid starts to flow from the interior chamber 55 of the container toward the mouth opening 45, through baffle opening 65 and outflow passageway 85. This increases the volume of the interior air cavity 115 and decreases the pressure of the interior air cavity 115. As mentioned with respect to FIGS. 7A–7F, there is an apex point 130 which can be a fixed point. Alternatively, the apex point 130 can be a point which moves between the lowest point of the mouth opening 120 and the highest point of the lower side 125 of the corner of the neck, depending on the tilting angle of the container. As soon as the exterior liquid level 110 reaches the apex point 130, the passageway 85 can no longer hold any more out-flowing liquid. Any further tilting of the container will cause the liquid to flow over the apex point 130 and out of the mouth opening 45. Because no outside air enters the container, as soon as the tilting stops, the liquid will stop flowing out of the container when the relationship below reaches a new equilibrium:

$$Pi3=Pa-(K \times H3).$$

In other words, the liquid will flow out of the container and the interior liquid level 105 will drop until the height difference H3 is decreased so that the above equation holds true again. Any increase in the tilting angle from A3 to A4 between FIG. 8C and FIG. 8D will cause the liquid to flow out, which flow may stop again if the height difference H4 can satisfy the equation for a further reduced interior air pressure Pi4. At the tilting angle A4, the exterior liquid level 110 reaches the end point 80 of the notch 70. Any further increase in tilting angle will allow ambient air to enter into the container which will break the partial vacuum in the interior air cavity 115. The outflow of liquid will no longer stop until the interior liquid level 105 is reduced to the same level of exterior liquid level 110 (e.g., the container has been effectively emptied) or the height difference H4 has been reduced to zero. This tilting angle A4 is the start-to-flow angle A as described in FIG. 7.

When the container tilts from FIG. 8D to FIG. 8E, more liquid will try to flow out and the exterior liquid level 110 is higher than the apex point 130. More area of the baffle 50 including the notch opening 75 will be exposed to the ambient air. Thus, ambient air will be able to enter into the interior chamber 55 of the container 10 through the exposed notch opening 75. The addition of a baffle notch 70 with notch opening 75 acts as an air vent, which acts to make the liquid pour out more smoothly and to reduce the glugging effect. At this tilting angle, the baffle opening 65 is sufficiently large enough to handle the outflow liquid and the small notch opening 75 can be devoted to handle the incoming air. This can prevent the formation of another partial vacuum inside the container and thus allow the continuous outflow of liquid until effectively all of the liquid has been dispensed (where the height difference H5 has been reduced to zero).

FIGS. 8A–8E shows that the most desirable liquid fill amount is that amount which allows the container to be tilted to tilting angle A4 (as shown in FIG. 8D) without having any liquid to flow out. In such a case, the tilting angle A4 is the start-to-flow angle. Any extra liquid over that proper amount will flow out of the container before the container is tilted to the start-to-flow angle. If this extra pre-flow of liquid is acceptable, the container can be filled higher than the most desirable liquid fill line.

Figure 9:
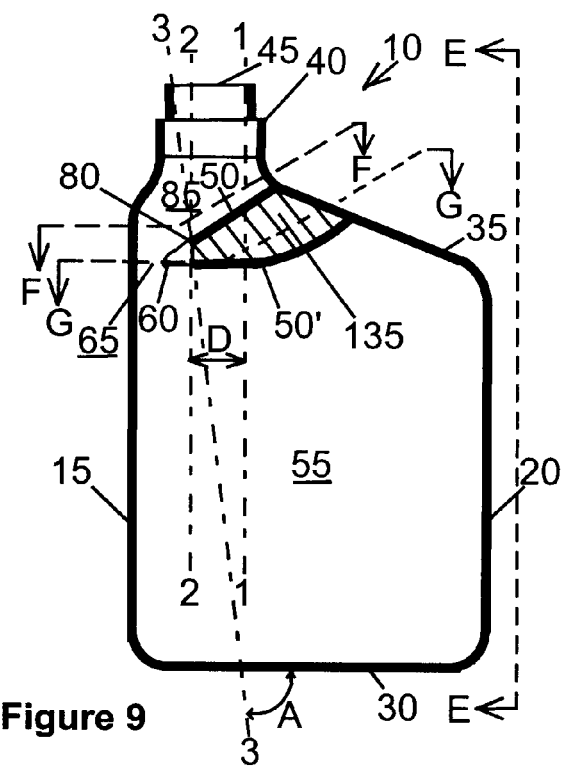
FIG. 9 is a schematic representation of a cross-sectional side view of an example embodiment of the spill-and-glug-resistant container where the baffle is an integral part of a blow-molded container.

The baffle shown in the example embodiments of FIGS. 1–8 can be inserted into an otherwise ordinary container to create a spill-and-glug-resistant container. However, in the mass-production environment of the highly competitive container industry, it is not economically feasible to insert this baffle into already formed containers. FIG. 9 is a schematic representation of the cross-sectional side view of another preferred embodiment of spill-and-glug-resistant container 10. A specially designed mold can manufacture this container with built-in baffle having an optional notch during the same blow molding process of making the container 10. This particular example container 10 has rounded corners. Container 10 has a pouring sidewall 15, an opposite sidewall 20 and two other sidewalls 25 in between. It also has a bottom 30, a top 35, a neck 40 and a mouth opening 45. The baffle 50 is formed during the same blow molding process of making the rest of the container by pinching a portion of two other sidewalls 25 together to form a first baffle 50 and a second baffle 50' with a reinforcing rib 135 in between. The pinching process is achieved in the mold and will be described later. To create a notch 70 in the baffle, a slightly reduced pinching of the two sidewalls will cause the baffle to have a notch 70 with notch opening 75 at the edge of the baffle 60. Additional details are provided in FIGS. 13–15. Alternatively, the first and second baffles may be formed by the indentation of two sidewalls of the container body toward each other, the first and second baffles extending toward each other. The first and second baffles, regardless of how they are formed, may be separated by a gap, touch each other partially, or touch each other completely.

Figure 10:
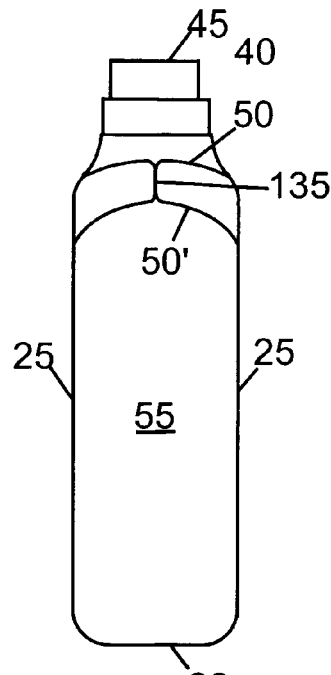
FIG. 10 is a schematic representation of the side view of the improved container of FIG. 9 taken along line E—E.

FIG. 10 is a schematic representation of the side view of the container of FIG. 9 taken along line E—E. The first baffle 50 and the second baffle 50' with the reinforcing rib 135 act like an I-beam and are blow-molded in the same blow molding process which forms the container. This I-beam configuration provides a strong support for the container.

Figure 11A:
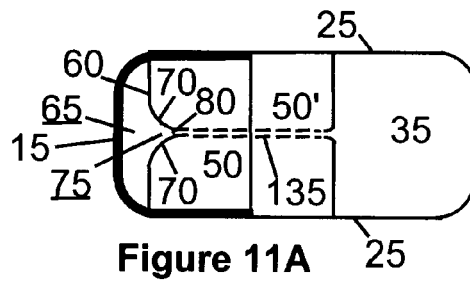
FIG. 11A is a schematic representation of a cross-sectional view of the improved container of FIG. 9 taken along line F—F.
Figure 12A:
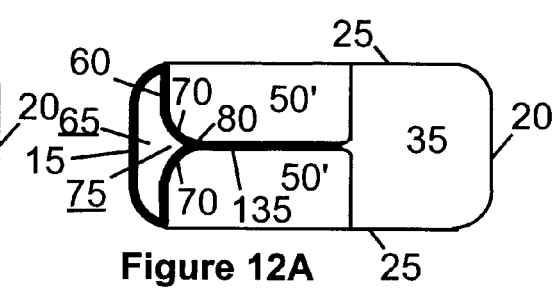
FIG. 12A is a schematic representation of a cross-sectional view of the improved container of FIG. 9 taken along line G—G.
Figure 11B:
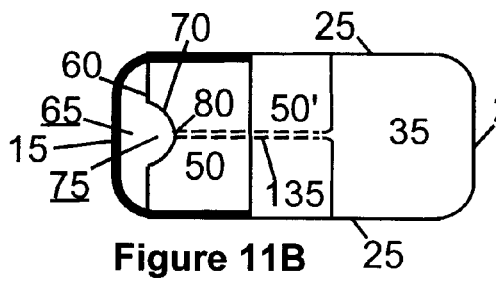
FIGS. 11B and 11C are schematic representations of two alternate configurations of the baffle notch shown in FIG. 11A.
Figure 12B:
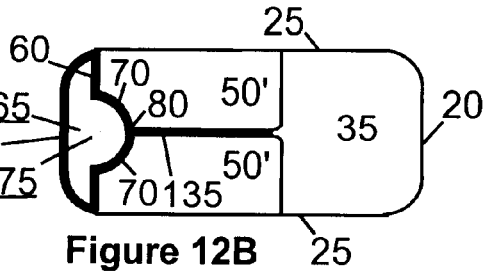
FIGS. 12B and 12C are schematic representations of two alternate configurations of the baffle notch shown in FIG. 12A.
Figure 11C:
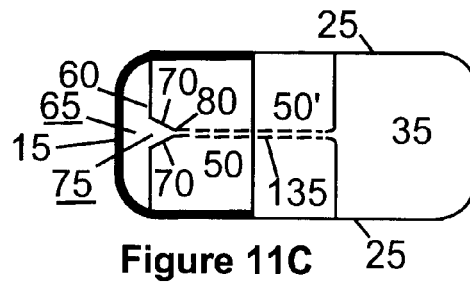
Figure 12C:
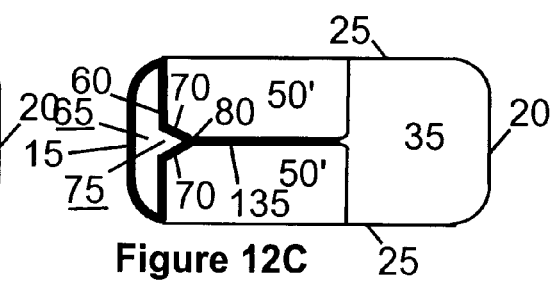

FIG. 11A is a schematic representation of the container of FIG. 9 taken along line F—F. In FIG. 11A, the notch 70 has two sides which taper to a point. FIGS. 11B and 11C show two alternate configurations of the baffle notch 70 such as a notch 70 having a rounded end 80 or a pointed end 80. FIGS. 12A–12C are schematic representations of the container of FIG. 9 taken along line G—G, showing the three alternate configurations of the baffle notch 70. Virtually any other shape or configuration of notch 70 is contemplated.

Figure 13:
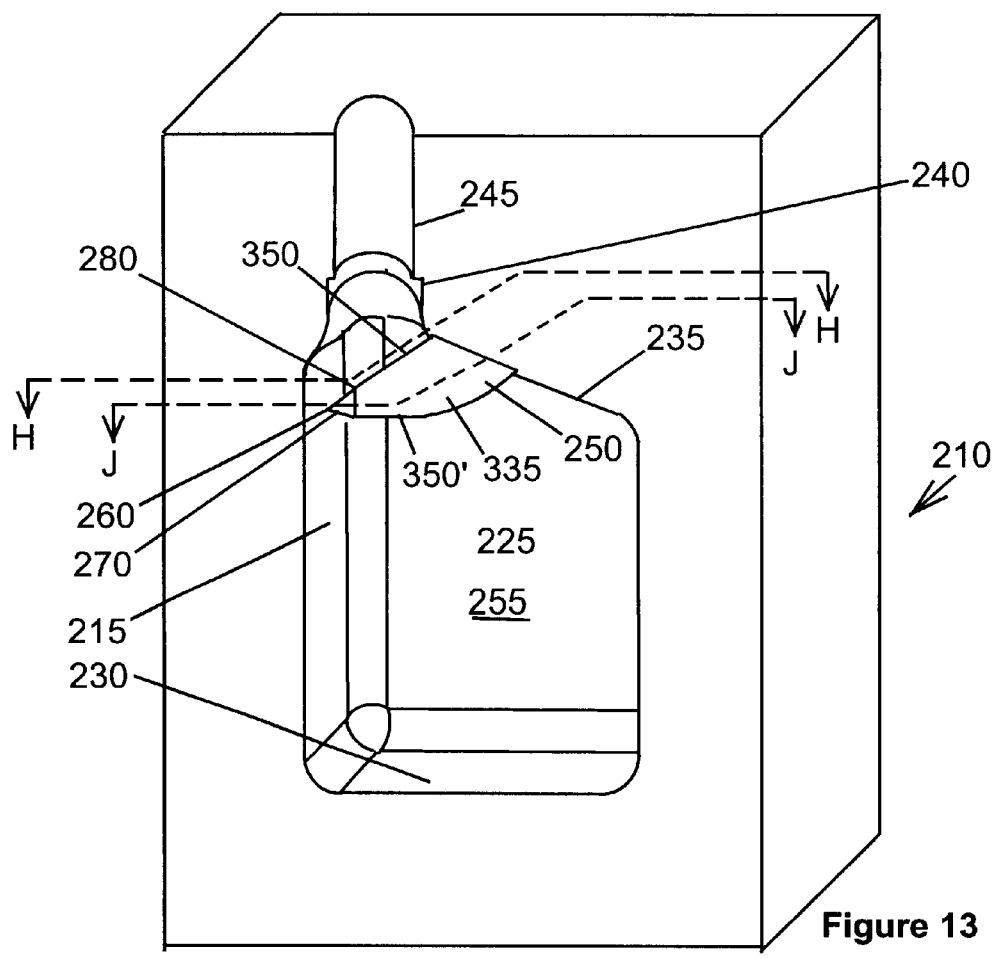
FIG. 13 is a schematic representation of a perspective view of one half of the mold block used for making the spill-and-glug-resistant container shown in FIG. 9.

A simple manufacturing method can blow mold this baffled container for mass production. In this method, the same blow-molding process used to form the container 10 may be used to form the baffle 50 and optional notch 70. FIG. 13 is a schematic representation showing one of a pair of the mold blocks 210 which may be used to manufacture the container 10 of FIG. 9. The mold blocks may be modified to be able to manufacture any of the embodiments and alternatives described in this disclosure. FIG. 13 is a simplified drawing that omits many of the detailed features of a typical mold block such as the vent holes, cap screws, different metal inserts and so on. The purpose of FIG. 13 is to demonstrate that the baffle can be made by the same blow molding process that makes the container. Of course, an alternative is to mold the container and then indent or deform the container to form the baffle. Yet another alternative is to mold the container and then insert a baffle. Referring to FIG. 13, this example mold block 210 has a body cavity 255 with five basic surface walls. Together with the other half of the mold block (preferably having the same mirror image of this mold block), a container such as the one shown in FIG. 9 can be blow molded. Surface 215 forms the pouring sidewall 15. Surface 220 forms the opposite sidewall 20 and surface 225 forms one of the two other sidewalls 25. Bottom surface 230 forms the container bottom 30 and the upper surface 235 forms the top 35. Entrance passages 240 and 245 form the neck 40 and mouth opening 45 respectively when the final product is trimmed to its proper dimensions.

Figure 14:
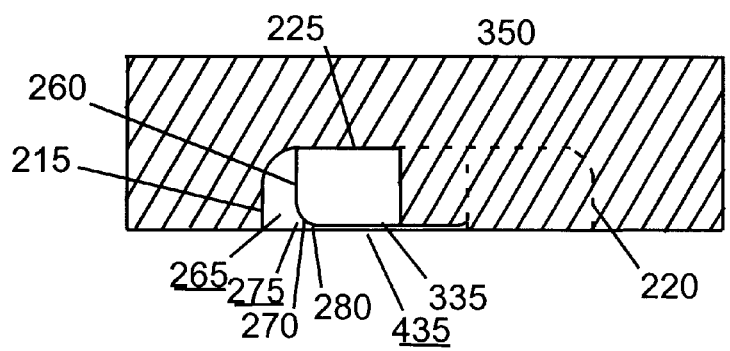
FIG. 14 is a schematic representation of the cross-sectional view of the half mold block of FIG. 13 taken along line H—H.
Figure 15:
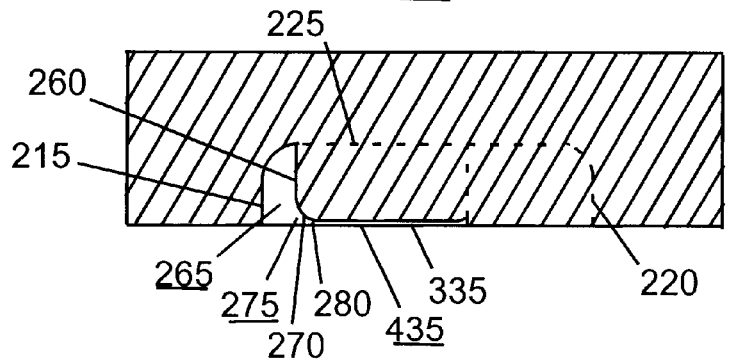
FIG. 15 is a schematic representation of the cross-sectional view of the half mold block of FIG. 13 taken along line J—J.

FIG. 14 is a schematic representation of the cross-sectional view of the mold block 210 of FIG. 13 taken along line H—H. The cavity 435 is preferably wide enough to fill the thickness of the molding plastic to form the reinforcing rib 135. The cavities 265 and 275 are large enough to create the baffle opening 65 and notch opening 75 respectively. FIG. 15 is a schematic representation of the cross-sectional view of the mold block 210 of FIG. 13 taken along line J—J. Referring to FIGS. 13–15, the built-in baffle is formed by the wedge-shaped body 250 which is raised out of the body cavity 255. The height 335 of the wedge surface of the raised wedge-shaped body 250 is preferably slightly lower than the full thickness of the mold block 210. After closing the two mold blocks, the void space between the raised wedge-shaped body 250 of each block forms the reinforcing rib 135. The end edge 260 of the raised wedge-shaped body 250 will be the end 60 of the baffle 50. The first and second surfaces 350 and 350' of the raised wedge-shaped body 250 form the first baffle 50 and second baffle 50'.

A small cutout (e.g., a rounded corner) 270 forms the baffle notch 70 with the end point 80 of the notch 70 ending at the vertical line 280. The cutout 270 shown in FIGS. 14 and 15 is just one example of a notch opening. Different curvatures and shapes can be used to produce different notch openings such as those shown in FIGS. 11A–11C and 12A–12C.

FIG. 16 is a schematic representation of the cross-sectional view of another example embodiment of an improved container. FIG. 17 is a schematic representation of the cross-sectional view of the container of FIG. 16 taken along line K—K. The spill-and-glug-resistant container 10 of FIG. 16 also has a baffle 50 and preferably, a baffle notch 70. The container tapers toward its neck 45. Of course, the notch 70 may have any suitable shape and configuration such as those shown in FIGS. 11A–11C and 12A–12C.

FIG. 18 is a schematic representation of the cross-sectional view of yet another example embodiment of an improved container. FIG. 19 is a schematic representation of the cross-sectional view of the container of FIG. 18 taken along line L—L. As with any of the embodiments described, the container may include a handle 140 which allows a user to carry the container and to pour a liquid out of the container more easily. The handle 140 can be located on any side of the container. There can even be more than one handle 140 if desired.

If desired, the baffled container can designed to be turned more than 90 degrees without spilling. If desired, the design can even allow the user to raise the bottom 30 of the container so high that the liquid level inside the container is higher than the mouth opening without spilling the liquid.

The baffled container makes the pouring of liquid out of the container much more manageable with less chance of spilling. Therefore, the improved container is able to pour a liquid while eliminating or reducing spills and glugging.

The baffled spill-and-glug-resistant container can be designed so that the container can be turned considerably after filling without spilling liquid. For example in one example embodiment, the bottom of the spill-and-glug-resistant container can be turned more than 90 degrees with the liquid line inside being higher than the mouth opening of the spill-and-glug-resistant container without spilling any liquid. The start-to-pour angle can be designed anywhere between 0 to 180 degrees. The baffled spill-and-glug resistant container could be used to dispense water, motor oil, anti-freeze, juice, milk, cooking oil and many other hazardous and nonhazardous liquids whenever spillage is a concern during pouring. Even the filling of the baffled container is better. If a user wants to fill the baffled container with water from a water fountain or sink faucet, the fact that the container can tilt a certain amount without pouring makes it easier to fill the container more fully.

Also contemplated is a detachable adapter which has a baffle and can be attached sealingly to a suitable existing container in order to form an improved spill-and-glug-resistant container. The detachable baffle adapter can be screwed or otherwise attached to an existing container.

FIGS. 20A–20C show examples of various versions of a liquid bottle 400 with an extended curved neck feature, which feature is described in U.S. Pat. Nos. 6,098,850 and 5,934,017 by the same inventor, the entirely of which disclosures are incorporated herein by reference for all purposes. The liquid bottle 400 may be of any shape or size. It generally has side walls 405, top wall 410 and bottom wall 415. If desirable, one side wall 406 may be flat to allow the liquid bottle to lay flat after filling. A major axis 16—16 generally defines the center line of the liquid bottle. The liquid bottle is in its upright position when the major axis is vertical and the top wall 410 is facing up. The extended curved neck 425 could be in the form of a letter "7" (as shown in FIG. 20A), or in the form of a letter "Z", or "S" (as shown in FIGS. 20B, 20C). A mouth opening 430 is located at the end of the extended curved neck. A minor axis 17—17 perpendicular to the plane of the mouth opening. In general, the minor axis 17—17 is parallel with the major axis 16—16. However, it is not necessary to do so, and the two axes may be oriented at a small angle. The extended curved neck 425 may start from almost anywhere on the liquid bottle 400, but usually starts from the top wall 410 or from the side wall near the top wall and on the opposite side of the flat side wall 406. A passageway 435 along the center line of the extended curved neck connects the mouth opening 430 with the inner chamber 420 of the liquid bottle 400. After the liquid bottle is filled with liquid in the upright position, it can be laid flat on the side wall 406 and the liquid inside the chamber 420 will not flow out even if the liquid level line 445 inside the chamber 420 is higher than the liquid level line 450 at the mouth opening as long as it is oriented correctly with the 7, Z or S shaped curved neck in the upright position where the mouth opening end of the curved neck is on the upper most location when the liquid bottle is laid down flat before tilting as shown in FIGS. 20A–20C with angle A at zero degree. The bottom wall 415 is lifted further to pour the liquid. The liquid will not start to flow until the angle "A" reaches a pouring angle which can be anywhere between zero (0) to nearly ninety (90) degrees. This angle "A" is determined by the shape, size, curvature and restrictions of the passageway 435. When this angle "A" reaches the pouring angle, outside air will start to enter the liquid bottle at the liquid level line 450 in the extended curved neck 425 and at the same time liquid inside the liquid bottle will start to flow out. The extended curved neck feature may be built-in with the liquid bottle (as shown in FIGS. 20A and 20B) or built into a cap 455 which is then attached to any existing bottle with a gasket 460 for leak proofing (as shown in FIG. 20C). Optional closing cap or plug 465 may be used to enclose the liquid bottle mouth opening when the bottle is not in use or during transportation.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. As another example, each feature of one embodiment can be mixed and matched with other features shown in other embodiments. Features and processes known to those of ordinary skill in the art of networking may similarly be incorporated as desired. Additionally and obviously, features may be added or subtracted as desired. Accordingly, the invention is not to be restricted except in light of the attached claims and their equivalents.

What is claimed is:

1. A container for dispensing a liquid with less spilling, the container comprising:
   a top;
   a bottom opposite the top;
   a container body disposed between the top and the bottom, the container body being configured to contain the liquid;
   an opening disposed on the top and adapted for the liquid to flow out of the container when the container is tilted beyond a start-to-pour angle;
   a baffle, located within the container body, the baffle blocking at least a portion of a projection of the opening into the container body so that when the container is tilted less than the start-to-pour angle, the liquid does not flow out of the opening and when the container is tilted beyond the start-to-pour angle, the liquid flows out of the opening;
   the baffle having a notch;
   wherein the notch in the baffle forms an air vent passage.

2. The container of claim 1 wherein the notch is located at the edge of the baffle that is not connected to the container body.

3. The container of claim 2 wherein the baffle is an integral portion of the container.

4. The container of claim 1 wherein the notch has a pointed end.

5. The container of claim 1 wherein the notch has a rounded end.

6. The container of claim 1 wherein the baffle is curved.

7. The container of claim 1 wherein the baffle is flat.

8. The container of claim 1 wherein the baffle is connected to the container except the pouring side of the baffle is not connected to the container.

9. The container of claim 8 wherein the notch is located at the side of the baffle that is not connected to the container.

10. The container of claim 9 wherein the baffle is an integral portion of the container.

11. The container of claim 9 wherein the notch has a pointed end.

12. The container of claim 9 wherein the notch has a rounded end.

13. The container of claim 9 wherein the baffle is curved.

14. The container of claim 9 wherein the baffle is flat.

15. The container of claim 1 wherein the baffle blocks at least half of the projection of the opening into the container body.

16. The container of claim 1 wherein the baffle blocks at least 80% of the projection of the opening into the container body.

17. The container of claim 1 wherein the baffle blocks all of the projection of the opening into the container body.

18. The container of claim 9 wherein the baffle blocks at least half of the projection of the opening into the container body.

19. The container of claim 9 wherein the baffle blocks at least 80% of the projection of the opening into the container body.

20. The container of claim 9 wherein the baffle blocks all of the projection of the opening into the container body.

21. The container of claim 1 wherein the baffle comprises a first baffle and a second baffle formed by the indentation of two sidewalls of the container body toward each other, the first and second baffles extending toward each other.

22. The container of claim 21 wherein the first and second baffles touch each other.

23. The container of claim 22 wherein the first and second baffles are joined to each other.

24. The container of claim 21 wherein each of the first and second baffles has a notch.

25. The container of claim 24 wherein the notches in the first and second baffles form the air vent passage.

26. The container of claim 23 further comprising a reinforcing rib connecting the first baffle to the second baffle.

27. The container of claim 9 wherein the baffle comprises a first baffle and a second baffle formed by the indentation of two sidewalls of the container body toward each other, the first and second baffles extending toward each other.

28. The container of claim 27 wherein the first and second baffles touch each other.

29. The container of claim 28 wherein the first and second baffles are joined to each other.

30. The container of claim 27 wherein each of the first and second baffles has a notch.

31. The container of claim 30 wherein the notches in the first and second baffles form the air vent passage.

32. The container of claim 29 further comprising a reinforcing rib connecting the first baffle to the second baffle.

* * * * *